US007911655B2

(12) United States Patent  (10) Patent No.: US 7,911,655 B2
Hatzav et al.  (45) Date of Patent: Mar. 22, 2011

(54) SYSTEM FOR EXTRACTING INFORMATION FROM AN IDENTITY CARD

(76) Inventors: Iuval Hatzav, Los Angeles, CA (US); Daniel Hatzav, Hod Ha'Saron (IL); Giyora Sharaby, Rosh Ha'ayn (IL); Ilan Ben-Shahar, Beer Sheva (IL)

(*) Notice: Subject to any disclaimer, the term of this patent is extended or adjusted under 35 U.S.C. 154(b) by 1777 days.

(21) Appl. No.: 10/959,261

(22) Filed: Oct. 6, 2004

(65) Prior Publication Data

US 2006/0072822 A1    Apr. 6, 2006

(51) Int. Cl.
    *H04N 1/04*    (2006.01)
(52) U.S. Cl. ............ 358/474; 358/483; 358/909.1; 358/482; 358/509; 358/475; 348/156; 348/207; 382/284; 382/159; 235/468
(58) Field of Classification Search ............ 358/474, 358/473, 482, 483, 475, 509, 514, 518, 505, 358/520, 909.1, 909.6; 348/156, 96, 150, 348/207.1, 207.99, 211.14; 382/116, 117, 382/118, 284, 159, 190, 229, 312; 235/468, 235/487
See application file for complete search history.

(56) References Cited

U.S. PATENT DOCUMENTS

| 5,280,546 | A  | * | 1/1994  | Machida et al. ........... 382/299 |
| 5,572,251 | A  | * | 11/1996 | Ogawa ................... 348/207.99 |
| 5,585,926 | A  | * | 12/1996 | Fujii et al. .................. 358/471 |
| 5,642,160 | A  | * | 6/1997  | Bennett ..................... 348/156 |
| 6,243,503 | B1 | * | 6/2001  | Teufel et al. ................ 382/312 |
| 6,286,761 | B1 | * | 9/2001  | Wen ............................ 235/468 |
| 6,976,032 | B1 | * | 12/2005 | Hull et al. ........................ 1/1 |
| 6,994,200 | B2 | * | 2/2006  | Jenrick et al. .............. 194/206 |
| 7,388,691 | B2 | * | 6/2008  | Wang ......................... 358/474 |
| 7,508,424 | B2 | * | 3/2009  | Hayashi .................... 348/231.2 |
| 7,551,328 | B2 | * | 6/2009  | Kondo et al. .............. 358/474 |
| 7,561,183 | B1 | * | 7/2009  | Schaffner ................ 348/207.99 |
| 7,619,721 | B2 | * | 11/2009 | Jones et al. ................... 356/71 |
| 7,686,219 | B1 | * | 3/2010  | Wisilosky et al. ........... 235/385 |
| 2004/0028260 | A1 | * | 2/2004 | Higaki et al. ................ 382/118 |
| 2004/0028266 | A1 | * | 2/2004 | Jones et al. ................. 382/135 |
| 2005/0073436 | A1 | * | 4/2005 | Negreiro .................... 340/937 |
| 2005/0087598 | A1 | * | 4/2005 | Yamanaka et al. .......... 235/440 |
| 2006/0041542 | A1 | * | 2/2006 | Hull et al. ..................... 707/3 |

* cited by examiner

*Primary Examiner* — Negussie Worku

(57) ABSTRACT

The present invention provides a unique and novel system for acquiring digital images of identification documents such as drivers license, passports, or medical insurance records using a digital camera so as to establish a high resolution image and extracting data automatically with machine vision tools so as to acquire accurate data. The present invention teaches also a system that acquires multi-spectral images of both sides of the identification document.

22 Claims, 6 Drawing Sheets

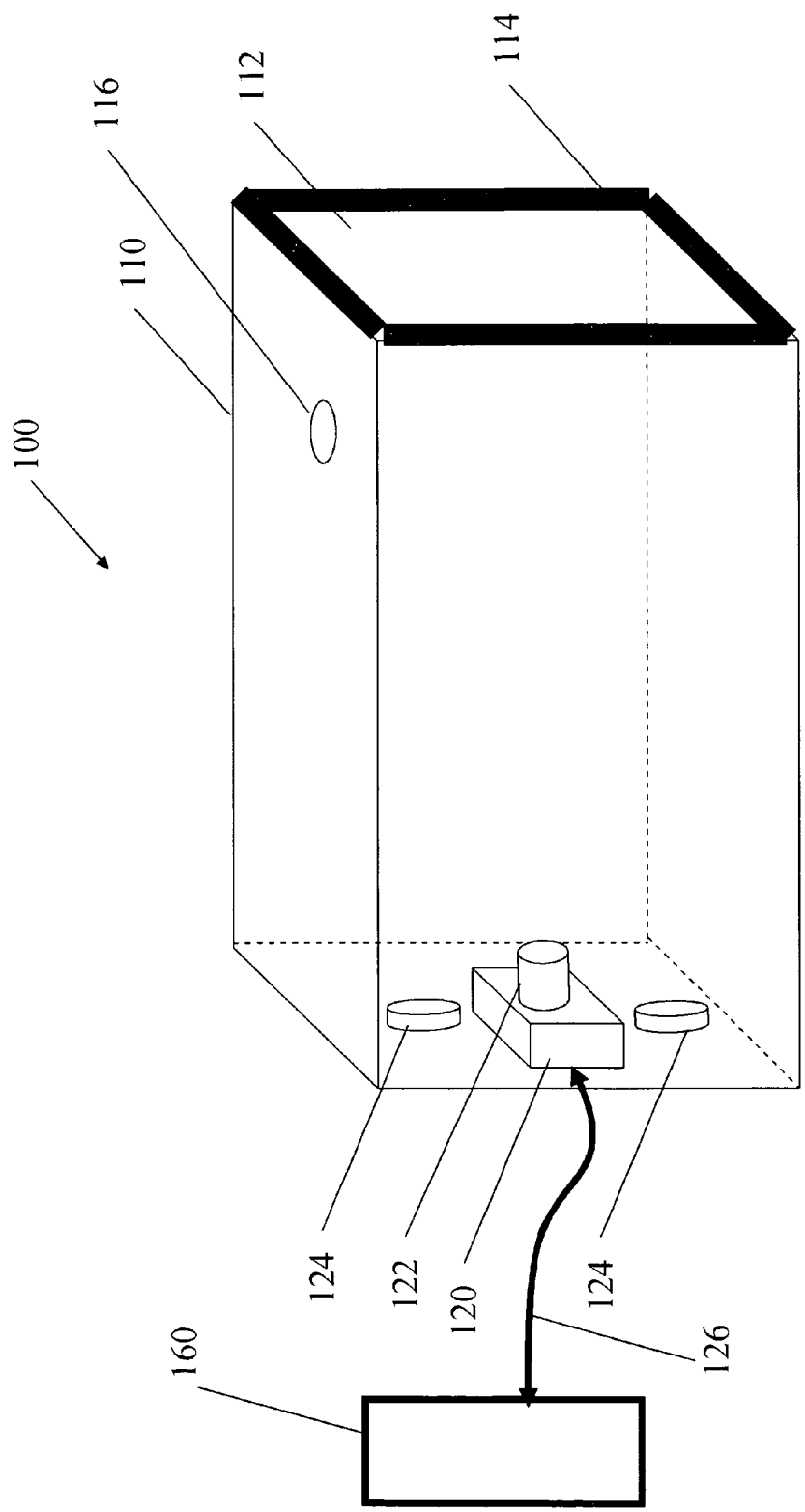
Fig. 1.a.

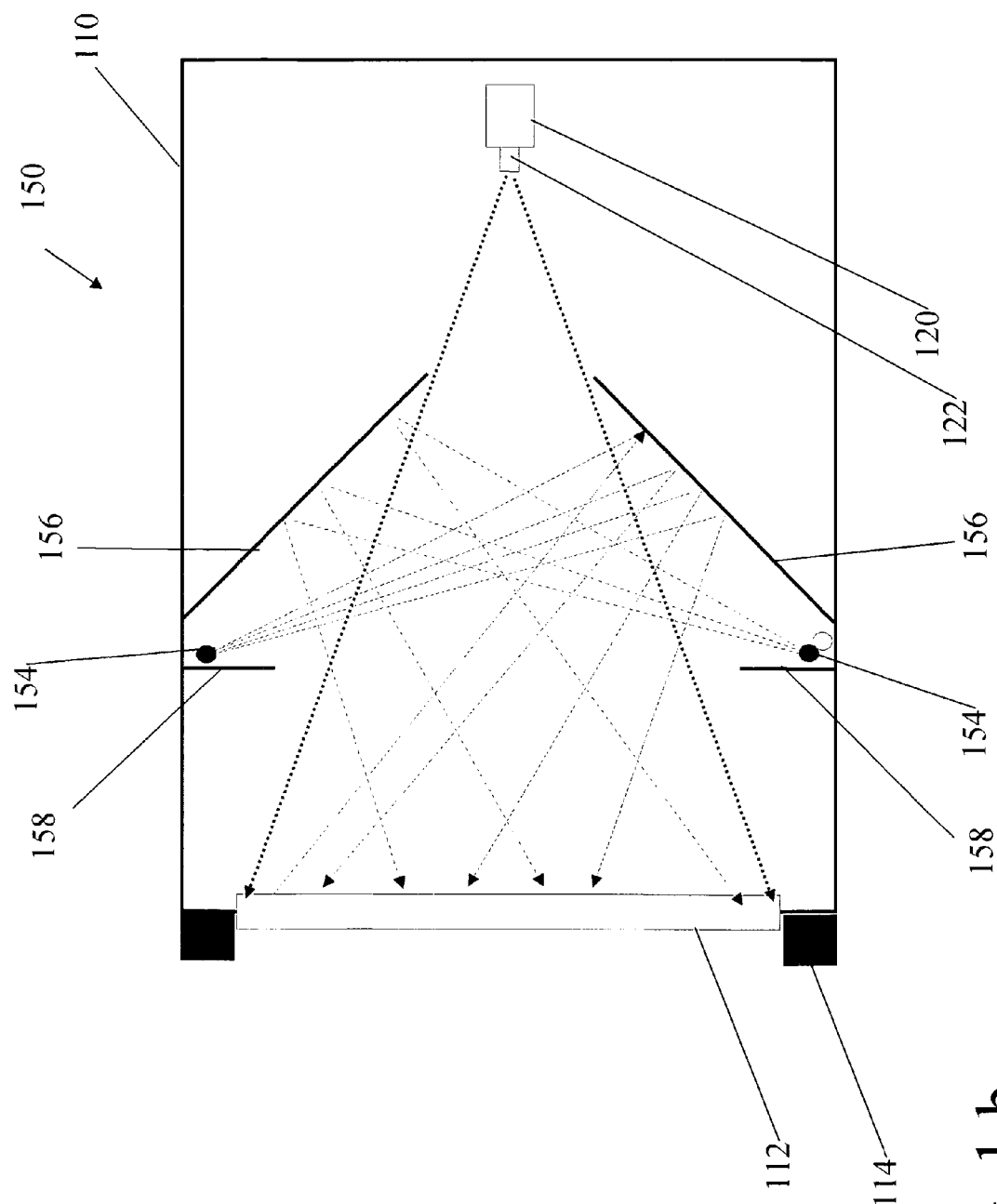
Fig. 1.b.

SYSTEM FOR EXTRACTING INFORMATION FROM AN IDENTITY CARD

FIELD OF THE INVENTION

The present invention relates to systems for extracting data. More particularly, the present invention relates to a system for acquiring digital images of identification documents such as driver's licenses, passports, and other similar identity cards and documents so as to extract data automatically with machine vision tools.

BACKGROUND OF THE INVENTION

A need exists in law enforcement and in many businesses to extract information from an identity document or identity card such as a credit card, driver's license or a passport. In some cases, it is convenient to automatically extract information from a non-official document such as business card or from a semi-official document such as library card, student card, store discount card, bank issued cards, checks etc.

Most of these identity documents contain information in text form. The information usually includes information on the type of the document and information specific to the document or the document holder such as: name, ID number, address, etc. Some of these identity documents may contain information encoded in non-textual form such as barcode, two-dimensional barcode such as PDF417.

In many situations such as in an airport, hotel, car-rental or at a store, it is advantages to have a system that rapidly extracts the data with high throughput and long meant time between failure (MTBF). Similarly, in a bank, there is a need to extract information from checks. In many of these places extracting information is manually performed by a person reading the information from the document and entering it to the data system by typing it. Manual methods are time consuming and may cause errors.

Systems that are available today are based on scanning technology that is relatively poor in its resolution characteristics when it works with an OCR and the results are not satisfactory due to multiple errors.

The use of video cameras for capturing an image out of an identity card is shown in U.S. Pat. No. 5,642,160 titled "Digital image capture system for photo identification cards" that describes a digital image capture system for a photo identification card using a video camera. The system is adapted to compare the image of the card holder extracted from the card to an image of the person that hand the identity card. There is no reference as for extracting the data from the card.

There is a need to provide a system that is adapted to extract the data of the identity card in high resolution so as to prevent errors while omitting any information that exist on the card such as state symbols, marks etc.

SUMMARY OF THE INVENTION

Accordingly, it is a principle object of the present invention to provide a system for acquiring digital images of identification documents such as driver's licenses, passports, medical insurance records, and other similar identity cards and documents so as to extract data automatically with machine vision tools.

In one embodiment the system comprises a box housing a digital camera equipped with a lens and at least one light source. Optionally, the light source is equipped with light diffuser to provide even illumination of the identity document. Optionally said diffuser is a light reflector. Optionally, light baffle prevents direct light reaching the identity document from the light source.

Optionally, front face of the box is made of transparent material and is optionally equipped with a frame to guide user in correct placing of the document against the front face. Alternatively, the front face has a slot with dimensions designed to accept an identity card. In this alternative, identity card is inserted into the slot to be acquired.

Acquiring data may be initiated by the user or may be initiated automatically when the system senses that a new document was placed. Sensing the placement of a new document may be done with a sensor within the system or by acquiring images at regular intervals and performing at least partial image analysis to identify placement of a document. Preferably, images taken for this purpose are at lower image quality than images taken for the purpose of information extraction.

Optionally, the system is equipped with a status display means, preferably an indicator light to inform the user when the system is ready for the next document etc.

The system is controlled by a processor. Optionally, the processor is connected to the box using a communication link such as USB2. Optionally, the processor is linked to external preferably official database for optional storing, verifying or distributing the extracted data.

Extraction of textual data from identity document is optionally assisted by prior knowledge of the type of document and a template stored within the processor or the remote database. Preferably, information extraction is done in stages: First, boundaries between text and background are determined based on minimum contrast between the character and other colored data on the card. Second, black and white glyphs are extracted using the data of boundaries. Third, OCR recognizes symbols and characters.

In another embodiment of the correct invention, both sides of an identity card may be imaged simultaneously. In one embodiment, two digital cameras are positioned one in each side of the document. Alternatively, one camera is used while using mirrors to reflect images of both sides of the card towards the camera.

Several types of images may be acquired by the system:

Gray level or color image (Red, Green Blue) may be acquired by white light illumination and conventional color two-dimensional sensor array.

Infrared (IR) reflection image may be acquired by IR illumination and using the red sensitive part of the sensor array.

Ultra violet (UV) reflectance image of the identity document may be acquired by illuminating the identity document with UV light and acquiring data from the blue sensitive pixels of a color sensitive sensor array.

Florescence image of the identity document may be acquired by illuminating the identity document with excitation light in UV or blue wavelength and acquiring data from the green and red sensitive pixels of a color sensitive sensor array.

In contrast to systems based on linear optical scanner, the current invention may acquire data more rapidly and optionally from both sides of the document. The inventive system may be designed with limited number or no moving parts and thus be more reliable than mechanically scamming systems.

Even illumination of the card, high resolution imaging, preprocessing of the image and prior knowledge of the template of the document, each contributes to higher accuracy of the extracted data.

Multi-spectral imaging enables locating authentication marks on the identity document, which are difficult to observe visually, or that are printed using invisible ink.

It is an object of the present invention to provide a system for extracting information from an identity card that is accurate and less error-prone.

These and other objects and advantages in accordance with the present invention will become more readily apparent from a consideration of the ensuing description, claims, and accompanying drawings.

Further features and advantages of the invention will be apparent from the drawings and the description contained herein.

BRIEF DESCRIPTION OF THE DRAWINGS

An exemplary embodiment of the invention is described in the following section with respect to the drawings. The same reference numbers are used to designate the same or related features on different drawings. The drawings are generally not drawn to scale.

FIG. 1.a. is a system for extracting information from an identity card using a digital camera according to an exemplary embodiment of the invention.

FIG. 1.b. is a system for extracting information from an identity card using a diffused light source according to another exemplary embodiment of the invention.

DETAILED DESCRIPTION OF EXEMPLARY EMBODIMENT

Figure 2:
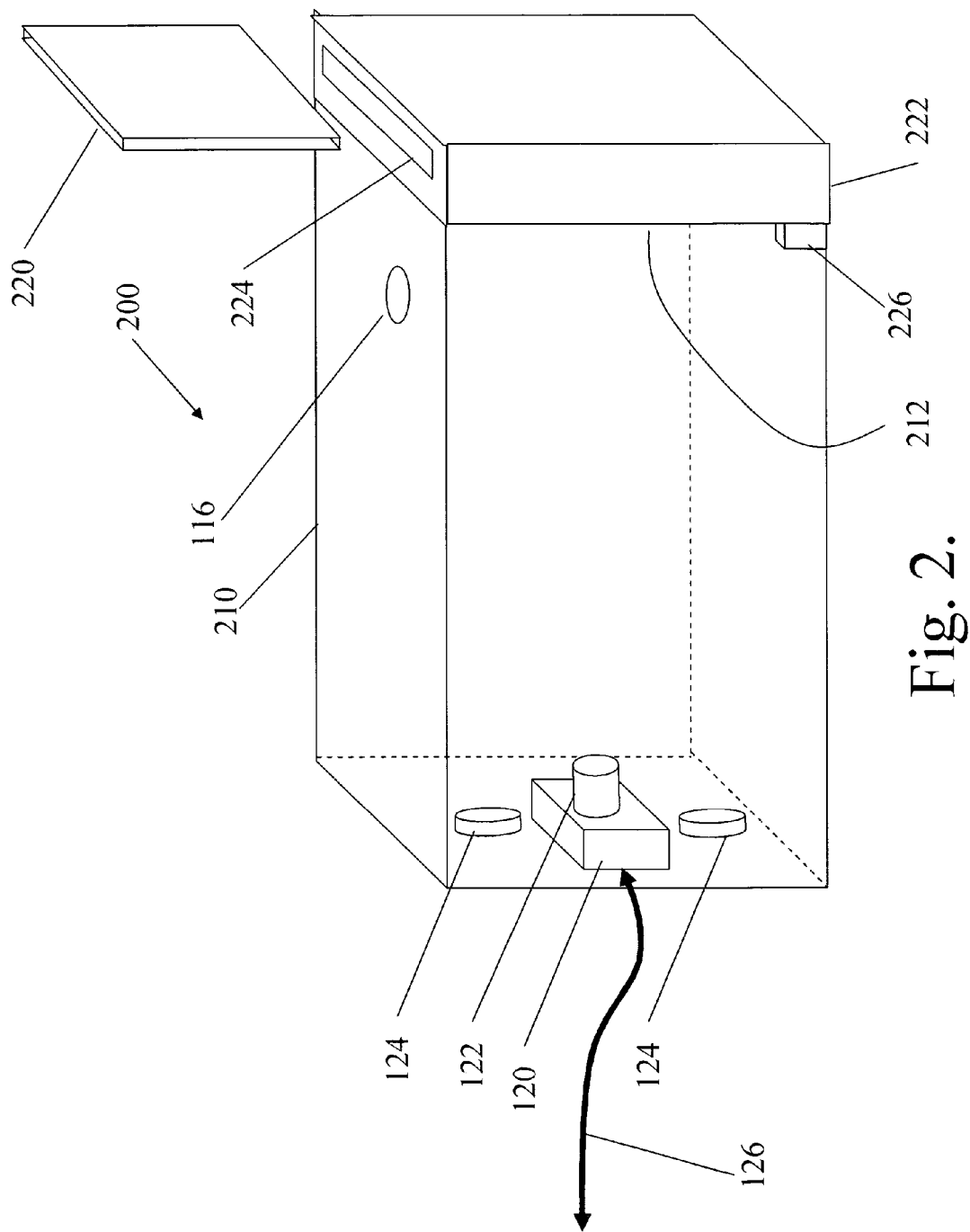
FIG. 2. is a system for extracting information from an identity card using a slotted card holder according to an exemplary embodiment of the invention.

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims.

With reference to the drawings, FIG. 1.a. illustrating a system for extracting information from an identity card using a digital camera according to an exemplary embodiment of the invention. System 100 for extracting information from an identity card uses a digital camera according to an exemplary embodiment of the invention.

A digital camera 120 equipped with a lens 122 is housed in a box 110 having a transparent front face 112. An identity card or an identity document such as a passport (not shown in this figure) is placed against the front face and is illuminated by light sources 124. The system 100 is connected to a data processing unit 160 such as a personal computer, laptop computer, PDA, or a palm computer using a communication link 126. Communication link 126 may use a standard serial or parallel protocol such as Universal Serial Bus (USB), RS232, General Purpose Interface Bus (GPIB), fiber optical communication link, RF communication such as Bluetooth etc. Preferably, USB2 communication link is used.

Optional indicator light 116 indicates the status of the system such as ready, busy etc.

To extract information, the user places an identity card or identity document such as a passport against the transparent face 112 of box 110.

Optionally, a frame 114 is used to guide the user in placing the identity card at a predefined position in respect to the front face 112. Optionally, the frame 114 may be replaceable wherein each of the several replaceable frames is built to accommodate identity card of different dimensions. Alternatively, the frame is substantially as large as the field of view of the camera 120 and the identity card is placed flush against one of the corners of frame 114. Alternatively, an identity card smaller than front face 112 may be placed anywhere against the front face and image processing program executed in data processing unit 160 is used to determine the location of the identity card.

In another embodiment of the invention depicted in FIG. 2. camera system 200 is housed in a box 210. In this embodiment, the frame is replaced with a slotted front face 222. The slotted front face has a slot 224. An identity card 220 may be inserted through the slot 224 such that its information carrying side faces the transparent front face 212. Alternatively, the slotted front face may have opening slightly smaller than the dimensions of the identity card instead of transparent front face 212.

Optionally, the system is equipped with card sensor 226. The sensor is capable of sensing if a card is placed and information can be acquired.

The sensor may be a micro-switch placed so the card activates it when the card is fully inserted. Alternatively, position of the identity card may be sensed by a photoelectric detector, pressure sensor or a proximity sensor Optionally, the system is equipped with Indicator light 116. For example, when the card sensor senses that a card was placed, the indicator light 116 changes its status to alert the user that data acquisition may start.

For example, indicator light may indicate one or more of the following system's states: Ready for card insertion, card is in position, data acquisition in progress, data processing in progress, remove card, system error. Optionally indicator light may be replaced with an LCD display, LED alphanumerical display or with audio indicator such as a buzzer or a speaker.

As a simple example, indicator light in the form of a single green LED may turn on only when acquisition ends and succeed. After the card is removed, the LED is turned off to indicate that the card should be removed and the system is ready for next card reading. Optionally, data acquisition may be activated by the card sensor.

Alternately, the user may manually activate data acquisition.

Preferably, the camera may acquire images at regular intervals, optionally using low image quality mode of operation. Image processing routine identifies the absence of a card or improperly inserted card and rejects the images. When the image processing routine identifies that a card is placed data acquisition is automatically activated. In this embodiment, indicator light will change appearance at the end of acquisition to signal the operator that he may remove the card. Taking an image may take a fraction of a second to two second depending on the camera and light source. When several types of data (for example visible and at least one of IR UV and FL) are acquired it is advantageous to keep the relative position between the several images by keeping the identity document stationary until data acquisition is completed. Optionally, the indicator light may also indicate the start of the data acquisition process signaling the user not to move the card until data acquisition is completed.

Returning to FIG. 1.a. At least one light source 124 is housed inside box 110. Light source 124 is design to illuminate the identity document to be acquired. Several light sources may be used. Substantially even illumination of the identity card may be achieved by use of several light source optionally equipped with proper light reflector or light diffuser.

In one embodiment of the invention, the light source produces substantially white light. In this embodiment, a color sensitive sensor array detects the light emitted from the source and reflected from the identity document.

In another embodiment, color imaging is achieved by sequentially illuminating the identity card with light of different colors.

Some identity documents contain information not visible to human eye. The information may be hidden using infrared (IR), ultra-violet (UV) or florescent (FL) ink.

In an exemplary embodiment of the invention light source 124 emits light in the visible and invisible wavelength bands. The light source may be a single source such as a flashlight, fluorescent light, incandescent light or white light LED or a combination of few sources with different wavelength spectra.

Preferably, light emitting diodes (LED) are used as light source for their low cost, small size, durability and low power consumption. Optionally a light source 124 is equipped with light diffuser to create uniform illumination of the identity document.

Camera 120 is equipped with an imaging lens 122 that focuses light from the identity document onto the 2-D sensor array. Lens 122 may comprise a combination of few lenses or a combination of refracting and reflecting optical elements. Reflecting elements may be used to reduce the overall size of the system by folding the optical path.

Digital camera 120 comprises a two-dimensional solid-state light sensor array. 2-D pixelated light sensors are commercially available. Common array are Silicon based. For example, an array of photodiodes may be used. Light impinging of an array is converted to electric charge. CCD or CMOS technology is used to readout the charge accumulated in each pixel to an analog to digital converter (ADC). The sensitivity spectra depend on the type of array used. For Silicon based arrays, the spectra spans from the near infrared (NIR) to the near ultraviolet (NUV). Some sensor array, such as used for TV cameras and digital still cameras are color sensitive. In these devices, Red Green and Blue (RGB) sensitive pixels are interspersed in the same array. Other color sensitive sensors uses optical filter to separate the light into wavelength bands and uses one sensor array for each color. Typically, the wavelength sensitivity of the red sensitive pixels extends into the NIR while the wavelength sensitivity of the blue sensitive pixels extends into the NUV.

Alternatively, a movable optical filter is placed in front of one 2-D array and wavelength bands are measured sequentially.

Color image of the identity document may be acquired by illuminating the identity document with white light and acquiring data by a color sensitive sensor array.

NIR reflectance image of the identity document may be acquired by illuminating the identity document with NIR light and acquiring data from the red sensitive pixels of a color sensitive sensor array.

NUV reflectance image of the identity document may be acquired by illuminating the identity document with NUV light and acquiring data from the blue sensitive pixels of a color sensitive sensor array.

Florescence image of the identity document may be acquired by illuminating the identity document with excitation light in UV, NUV or blue wavelength and acquiring data from the green and red sensitive pixels of a color sensitive sensor array. An optical filter designed to block the excitation wavelength may be used to protect the sensor.

The operation of the system for extracting information from an identity card using a digital camera is controlled by data processing unit 160.

Data processing unit 160 comprises at least digital processor and memory and optionally one or some of: mass data storage such as hard disk, removable storage, means for communication with remote location, input means such as keyboard, mouse or pad, and display unit, Data processing unit may be commercially obtained, there are in use units such as PC computer, Palm computer, PDA unit or may be a proprietary processor.

In some embodiments of the invention, data processing unit is physically separated from box 110. In this embodiment, communication link 126 is used to exchange commands and data between data processing unit 160 and electronic equipment associated with box 110 such as camera 120, light source 124, indicating light 116 and card sensor 126.

In another embodiment of the invention, data processing is integrated into the box.

Due to physical limitations of the light source 124, lens 122 and camera 120 the image acquired by the system may have to be pre-processed in order to extract the information on the identity document. Optionally, image is pre-processes by data processing unit 160 to correct some of these imperfections.

For example, color balance may be applied to correct color sensitivity of the sensor array or spectra of the light source or both.

For example, image distortion and deformation caused by aberration and imperfection in the lens may be corrected by distorting the image in the opposite way. A calibration image of a ruled card can be acquired in order to measure the distortion caused by the optical system.

Uneven illumination caused by imperfection in light spread from the light source may cause some parts of the image to be brighter or darker than the average brightness or to have different color balance. Similarly, deviation among pixels in the sensor array of sensitivity and dark signal may also cause variation in brightness. A calibration image of white or colored card may be used to measure the distortion caused by these effects. Optionally, few images taken in different conditions are used to calculate a pixel sensitivity correction map to be applied to the image during pre-processing.

UV, IR or FL information is often printed on top of visible features on the identity document. In order to make this information easy to detect, proper subtraction of the information printed in visible ink may be applied.

Similarly, text printed on the identity card may be printed on top of background of varying shade or on top of feature printed in other color. Optionally, known background is subtracted from the image during pre-processing.

Generally, the properties of the identity document are known and data pre-processing may be optimized accordingly.

Information in the identity card is extracted from the image. Optical character recognition (OCR) routine extracts alphanumerical information. By locating key features, the type of the identity document may be known or determined. For example, if the identity document is identified as a passport of a certain country, the location and meaning of textual information in the image may be predicted and used to assist the analysis.

Figure 5:
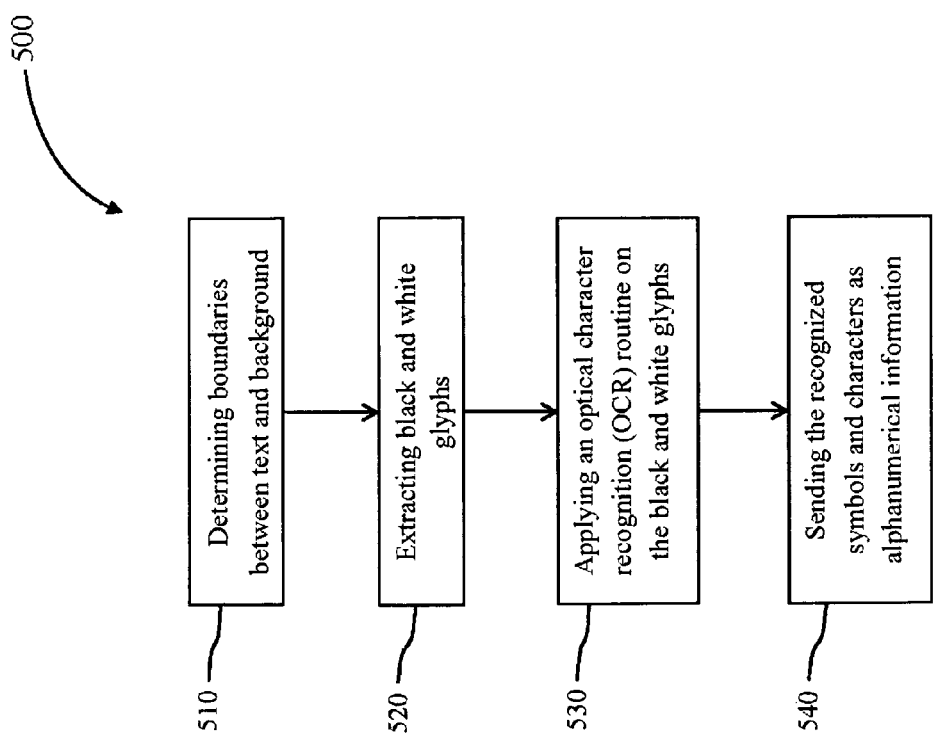
FIG. 5 is a data flowchart outlining an example method for extracting information from an identity document, using a system for extracting information from an identity card as shown in FIG. 2. or in FIG. 3, according to embodiments of the present invention.

Reference is now made to FIG. 5, which is a data flowchart outlining an example method 500 for extracting information from an identity document, using a system for extracting information from an identity card as shown in FIG. 2. (200) or FIG. 3. (300), according to embodiments of the present invention. Preferably, information extraction is done in stages: First, boundaries between text and background are determined (step 510) based on minimum contrast between the character and other colored data on the card. Second, black and white glyphs are extracted (step 520) using the data of boundaries. Third, OCR recognizes (step 530) symbols and characters.

Information extracted from the card may be sent (step 540) to remote location using communication link such as Internet, phone, fax or cellular networks.

Authentication of an identity card is optionally done by comparing features such as logo, color, fonts, and other characteristics of the documents to database stored in data processing unit or in a remote database. Alternatively or additionally, authentication of an identity card is done by comparing the extracted information to a database of records of valid or invalid documents.

Optionally, information extracted from identity document is used to save the user the task of manually inputting the information. For example, at a hotel check-in the necessary information could be extracted from a driver license and a credit card.

Optionally, information extracted from identity document is used for retrieving other information associated with the identity of the document holder. Optionally part of extracted information, for example name, family name or identity number is used as key words to perform a search for retrieving other information associated with the document holder such as credit history, etc. The search may be performed in databases stored locally in the processing unit, or in remote databases or both.

Optionally extracted information is used to augment database. For example, in a store or a hotel, a database of clients or visitors may be created and augmented so the owner of the system will be able to use it as a digital database for mailing advertisement or any other information.

Optionally several images of the same identity document may be imaged, analyzed and the extracted data be stored as one record. For example, two sides of the same identity card or several pages of a passport may be imaged sequentially.

Reference is now made to FIG. 1.*b*. depicting a system 150 for extracting information from an identity card using a diffused light source according to another exemplary embodiment of the invention.

A digital camera 120 equipped with a lens 122 is housed in a box 110 having a transparent front face 112 and optional frame 114. An identity card or an identity document such as a passport (not shown in this figure) is placed against the front face and is illuminated by light sources 154.

In this exemplary embodiment of the invention, light from light source 154, shown as dashed arrows, is emitted from light source 154 and reflected by reflector 156 before arriving at the transparent front face 112. Reflector 156 may be curved and may be made of, or painted with light diffusing material in order to achieve even illumination of the identity document. Optionally, reflector 156 may be curved.

Direct optical path between light source and the identity document is optionally blocked by light baffle 158 to prevent unwanted bright spots in the image.

Light reflector 156 is built so it does not interfere with field of view (marked as doted arrows) of camera 120.

Several light sources, light reflectors and light baffles may be housed in the same box for more even illumination.

In many occasions, it is desired to image both sides of the card without having to place the card twice, each in every side. For that reason, simultaneous two side imaging using two cameras is employed.

Figure 3:
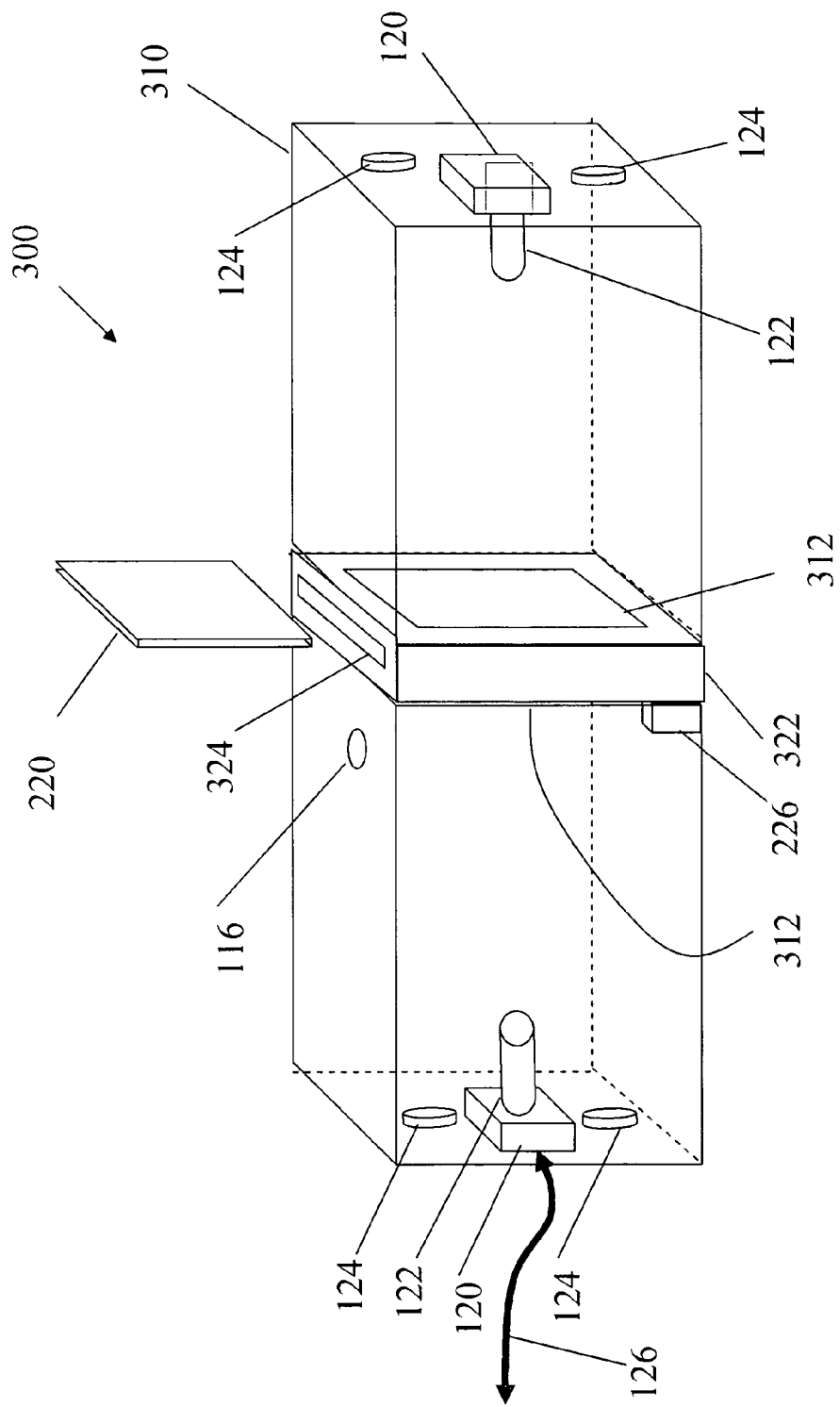
FIG. 3. is a system for extracting information from both sides of an identity card using two digital cameras according to an exemplary embodiment of the invention.

Reference is now made to FIG. 3. depicting a system 300 for extracting information from both sides of an identity card 220 using two digital cameras according to an exemplary embodiment of the invention.

Two digital cameras 120 each equipped with a lens 122 are housed in a box 310 having a slotted card holder 322. An identity card 220 is inserted into slot 324 so each of its sides is against one of a transparent wall 312. Optionally, the system is equipped with card sensor 226. The sensor is capable of sensing if a card is placed and information can be acquired. Optionally, the system is equipped with Indicator light 116. When the card sensor senses that a card was placed, the indicator light 116 changes its status to alert the user that data acquisition may start. The system is connected to a data processing unit communication link 126. At least two light sources 124 are placed so both sides of the identity card can be illuminated. In this embodiment, both sides of an identity card may be imaged and analyzed at once.

Optionally, light sources in this embodiment are in the configuration of FIG. 1.*a*.

Alternatively, the slotted card holder 322 may have opening slightly smaller than the dimensions of the identity card instead of transparent front face 312.

Optionally, one camera can be employed in a simultaneous two side imaging using one camera.

Figure 4:
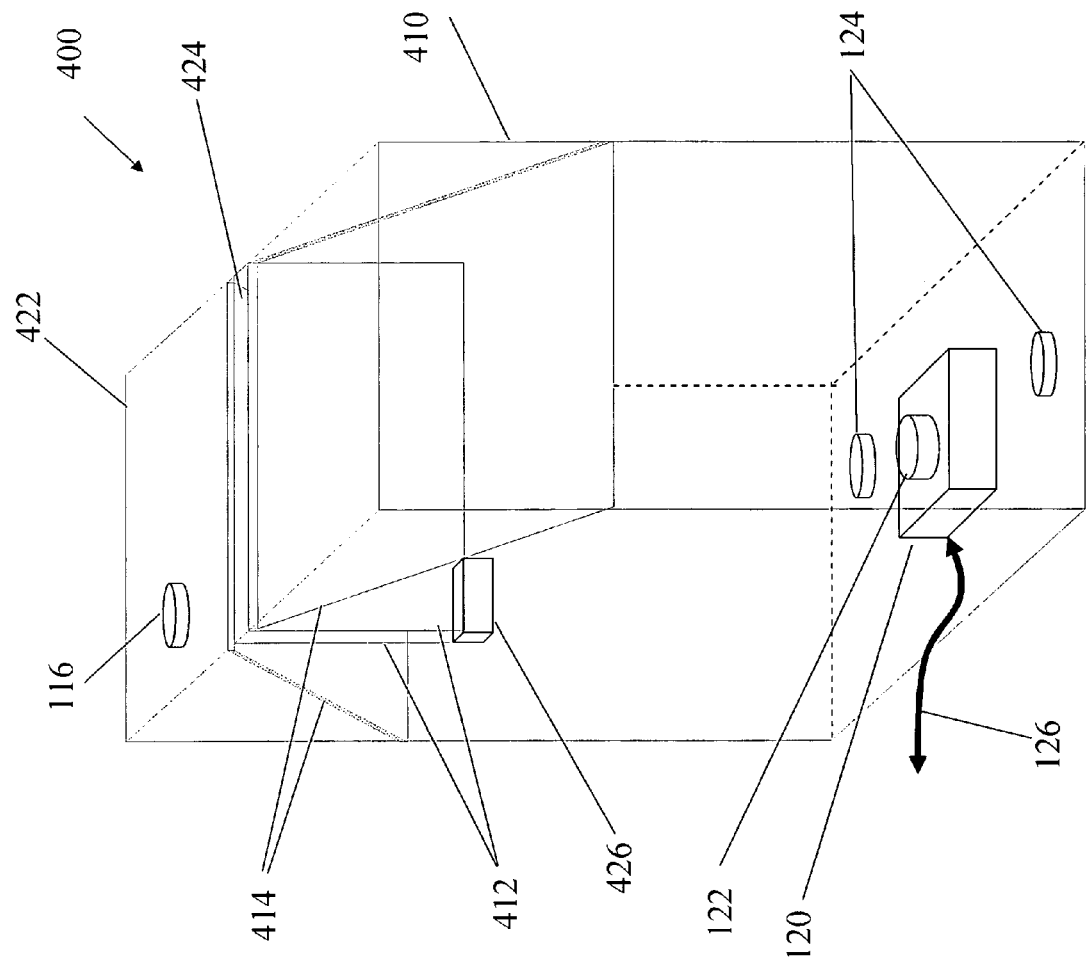
FIG. 4. is a system for extracting information from both sides of an identity card using one digital camera according to an exemplary embodiment of the invention.

Reference is now made to FIG. 4. depicting an embodiment of a system 400 for extracting information from both sides of an identity card using one digital camera. A digital camera 120 equipped with a lens 122 is housed in a box 410 having a slotted face 422. An identity card is inserted into slot 424 so each of its sides is against one of a transparent wall 412. Optionally, the system is equipped with card sensor 426. The sensor is capable of sensing if a card is placed and information can be acquired. Optionally, the system is equipped with Indicator light 116. When the card sensor senses that a card was placed, the indicator light 116 changes its status to alert the user that data acquisition may start. The system is connected to a data processing unit communication link 126.

Two mirrors 414 are positioned so that reflections of both sides of the identity card are reflected towards camera 120.

At least one light source 124 is placed within the box 410 so both sides of the identity card may be illuminated.

While the invention has been described with reference to certain exemplary embodiments, various modifications will be readily apparent to and may be readily accomplished by persons skilled in the art without departing from the spirit and scope of the above teachings.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents that perform the same function, even if the structure or acts are different, as known in the art. Therefore, the scope of the invention is limited only by the elements and limitations as used in the claims. The terms "comprise", "include" and their conjugates as used herein mean "include but are not necessarily limited to".

The invention claimed is:

1. A system for extracting information from an identity document comprising at least one light source for illuminating the identity document; at least one digital camera comprising a lens and a two-dimensional sensor array for acquiring at least one two-dimensional image of the identity document; and a processor for processing said at least one two-dimensional image, said processor configured to run an optical character recognition (OCR) routine for extracting textual information from the identity document in the form of alphanumerical information, wherein said extracting textual information comprises the following steps:
    a) determining boundaries between text and background based on minimum contrast between the character and other colored data on the identity document;
    b) extracting black and white glyphs using at least a portion of said determined boundaries;
    c) applying said OCR routine on said black and white glyphs, thereby recognizing symbols and characters; and
    d) sending said recognized symbols and characters as alphanumerical information.

2. A system according to claim 1, further comprising an indicator light for indicting the status of the system.

3. A system according to claim 1, further comprising a box for housing said digital camera and said light source; and a communication link for connecting said box to said processor.

4. A system according to claim 1, acquiring at least red green and blue images of the identity document.

5. A system according to claim 4, further acquiring at least one image selected from the group of IR reflection image, UV reflection image and fluorescence image.

6. A system according to claim 1, further comprising mirrors for simultaneously imaging both sides of said document.

7. A system according to claim 1, wherein said at least one light source comprises at least two light sources for respectively illuminating both sides of said document; and wherein said at least one digital camera comprises two digital cameras for respectively imaging both sides of the identity document.

8. A system according to claim 1, wherein said light source includes a light diffuser for even illumination of the identity document.

9. A system according to claim 1, wherein said light diffuser is a light reflector.

10. A system according to claim 9, including light baffle for preventing direct illuminating the identity document by said light source.

11. A system according to claim 1, wherein said extraction of textual data from the identity document is assisted by prior knowledge of the type of said document.

12. A system according to claim 1, wherein said acquisition of said at least one two-dimensional image is automatically initiated by sensing proper placement of the identity document.

13. A system according to claim 12, wherein said sensing proper placement of the identity document is performed using a sensor.

14. A system according to claim 12, wherein said sensing proper placement of the identity document is performed by acquiring images and performing at least partial image processing of said images.

15. A system according to claim 14, wherein said images used for sensing proper placement of identity card are of lower quality than images used for extracting information.

16. A system according to claim 1, wherein said alphanumerical information is used to save a user from manually inputting said information.

17. A system according to claim 1, wherein said extracted information is used to augment a database.

18. A system according to claim 1, wherein said extracted information is used as key words to perform a search.

19. A system according to claim 1, wherein said processor is configured the run pre-processing steps to facilitated better quality images of the identity document, before applying said OCR routine for extracting textual information from the identity document in the form of alphanumerical information.

20. A method for extracting information from an identity document, comprising the steps of:
    a) providing a system for extracting information from an identity document including:
        i. at least one light source for illuminating the identity document;
        ii. at least one digital camera having a lens and a two-dimensional sensor array for acquiring at least one two-dimensional image of the identity document; and
        iii. a processor for processing said at least one two-dimensional image;
    b) determining boundaries between text and background based on minimum contrast between the character and other colored data on said image of the identity document;
    c) extracting black and white glyphs using at least a portion of said determined boundaries;
    d) applying an optical character recognition (OCR) routine on said black and white glyphs, thereby recognizing symbols and characters; and
    e) sending said recognized symbols and characters as alphanumerical information;
wherein said determining of the type of the identity document and said identifying said textual field regions in the identity document, are performed before applying said OCR routine on said black and white glyphs.

21. A method according to claim 20, further comprising pre-processing steps to facilitated better quality images of the identity document, performed before applying said OCR routine on said black and white glyphs.

22. A method according to claim 21, wherein said pre-processing steps comprise at least one of the following steps:
    i) determining the type of the identity document and removing the background from the image of the identity document;
    ii) Calibrating the illumination parameters, before acquiring an image of the identity document for extracting information from the identity document; and
    iii) correcting image distortions caused by know lens distortions.

* * * * *